Dec. 13, 1966  F. CLEMENT  3,291,877
STRENGTHENING POLYETHYLENE BOTTLES
Filed Dec. 11, 1963  2 Sheets-Sheet 1

INVENTOR
Finn Clement
BY Richard C. Witte

ATTORNEY

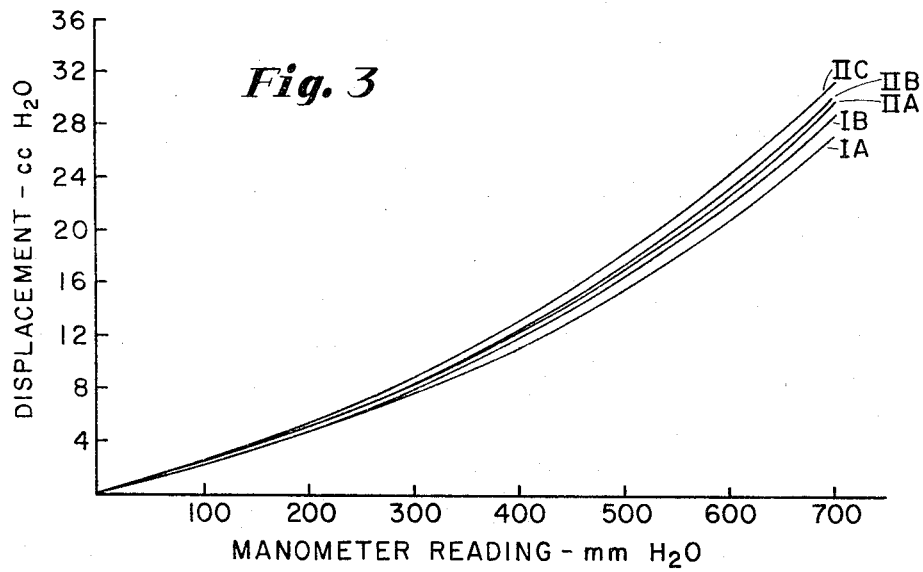
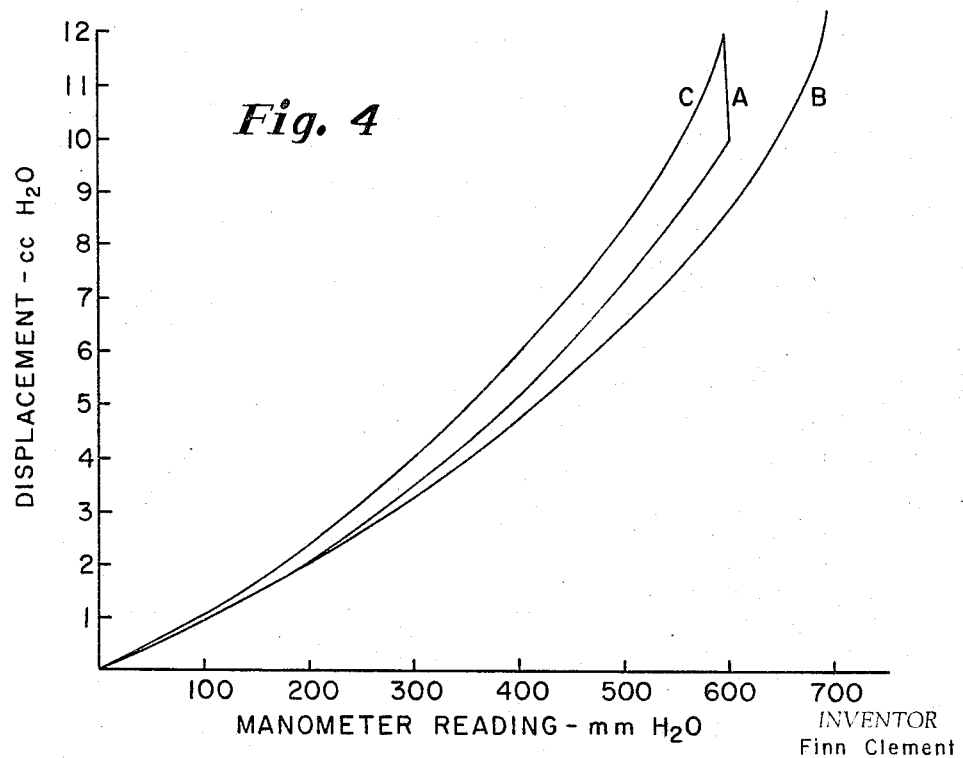

United States Patent Office 3,291,877
Patented Dec. 13, 1966

3,291,877
STRENGTHENING POLYETHYLENE BOTTLES
Finn Clement, Springfield Township, Hamilton County, Ohio, assignor to The Procter & Gamble Company, Cincinnati, Ohio, a corporation of Ohio
Filed Dec. 11, 1963, Ser. No. 329,811
7 Claims. (Cl. 264—100)

This invention relates to a process for the strengthening of polyethylene bottles. More particularly this invention relates to a method of orienting (and reorienting) crystallites and molecules of molded polyethylene bottles by means of applying internal stress to the walls of the bottle, whereby crystallites and molecules are oriented (and reoriented) in the direction of least strength.

A "crystallite" is a part of a crystal that has its atoms and molecules arranged in a perfect crystal lattice. An ordinary crystal is composed of an assemblage of a large number of such crsytallites, some of which are almost perfectly aligned with one another while others are out of alignment to various extents. The molecules and crystallites that are out of alignment are aligned (or oriented) in the process of the present invention. The molecules and crystallites that are already aligned are realigned (or reoriented) in the process of the present invention. The above alignment and realignment are in directions such as to provide greater bottle strength.

Often the oxygen in the head space of a capped polyethylene bottle containing liquid is at least partially absorbed by the liquid in the bottle. This absorption of oxygen causes a decrease in internal pressure within the bottle. Also a decrease in internal pressure within the bottle results when a warm product is introduced into the bottle, and the bottle is capped, and the product cools to room temperature and contracts. Such decreases in internal pressure within such a polyethylene bottle cause the bottle to deform and often cause any paper label on the bottle to loosen, crease or tear. Such deformation can be reduced with strengthened polyethylene bottles. Moreover, a strengthened bottle is easier to label than an unstrengthened one of the same type. An increase in resistance to deformation would allow the use of polyethylene bottles of lighter weight than those now used to provide a given resistance to deformation.

Ordinarily polyethylene bottles are molded at a temperature above the softening range of crystallite melting point of the polyethylene. No crystallites form until the molten polyethylene mass contacts the cooled wall of the mold. The polyethylene layer immediately adjacent to the die cools quickly so that few crystallites form there and the layer is mostly amorphous. For this reason, there apparently is little molecular orientation in this layer. The next polyethylene layer and the inside polyethylene bottle wall layers cool more slowly and crystallites form in these layers and comprise the bulk thereof. Molecular and crystallite orientation takes place in these layers. Molecular orientation is caused by the stress produced when the polyethylene flows to coat the entire inside wall of the mold; the molecular and crystallite orientation are caused by the stress due to contraction of the bottle as it cools. Such orientation can provide bottle wall strength if it is in the proper directions; however, it for the most part is not in the proper directions where most bottle strength is needed.

It is, therefore, an object of this invention to provide a process for increasing the resistance to deformation of polyethylene bottles while at the same time preserving the original volume and shape of such bottles.

It is a further object of this invention to make possible the use of a lighter weight polyethylene bottle for a given resistance to deformation than is now being used.

These and other objects will be apparent after referring to the following specification and figures, the details of which are hereinafter more fully described.

FIGURES 3 and 4 are plottings of resistance to deformation of specified polyethylene bottles in terms of a manometer reading in mm. $H_2O$ vs. bottle displacement in cc. water as more fully described in Examples III and IV.

Figure 1:
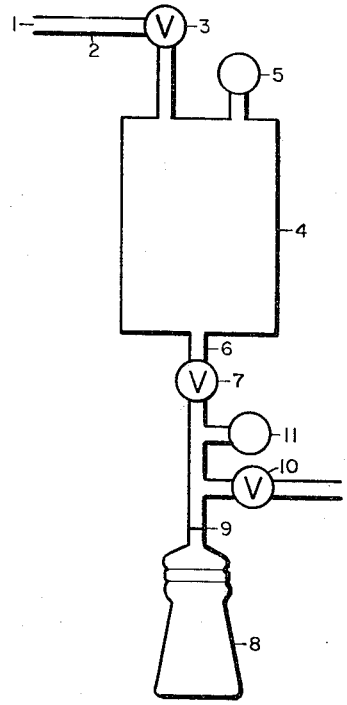
FIGURE 1 is an apparatus, diagrammatically shown, for pressurizing polyethylene bottles.

It has been found that resistance to deformation of bottles made from polyethylene of from about .940 to about .950 density can be increased by subjecting the bottles internally to the highest pressure they can take without bursting at a given temperature and in a given time as hereinafter more fully described, in order to orient and reorient crystallites and molecules of polyethylene. This process is particularly applicable to bottles that have been blow-molded.

Processes for uniaxially and biaxially orienting polyethylene films and sheets in strengthening directions are well known. There have, however, apparently been no processes prior to the present invention for orientation, (and reorientation), in strengthening directions, of crsytallites and molecules in polyethylene bottles which have been molded and allowed to cool. The orientation and reorientation of the present invention is not uniaxial or biaxial, but in the direction of least strength.

Moreover, prior processes for polyethylene crystallite and molecule orientation use temperatures in the range from the crystallite melting point or softening point to about 60° C. below said points. At such high temperatures, internal stress on polyethylene bottles would cause undesirable permanent increase in volume of much more than about 3.5%. Such permanent deformation is acceptable and desirable when film or sheets are involved. However, permanent increase in volume of more than about 3.5% cannot be tolerated where bottles are concerned because outage and bottle shape must be preserved.

The polyethylene bottles used in the process of this invention should be made of from about .940 to about .950 density polyethylene and preferably from about .945 density polyethylene. With polyethylene bottles of density somewhat greater than about .950, use of the pressurizing process of this invention may or may not cause increase in resistance to deformation. It is not known why this is so. Subjecting bottles of lower density polyethylene than this range to the pressurizing process of the present invention provides only a very small and insignificant increase in resistance to deformation. Polyethylene bottles are well known and specification of the density of the polyethylene from which the bottle is made characterizes definitely the bottle and the polyethylene to one familiar with the art.

Furthermore, application of internal pressure according to the present process increases resistance to deformation of the bottle only in those areas free from sharp angles such as would act as hinges. If the bottle does have sharp angles, and the applied force is expended at these angles, then there is no increase in resistance to deformation in the bottle wall or label panel in such areas.

The bottles upon which the process of this invention is most effective should have wall thicknesses ranging from about 0.01 inch to about 0.06 inch and more preferably from about 0.012 inch to about 0.044 inch. (Wall thicknesses are measured at the label panel, i.e., the generally vertical surface of an upright bottle which often is specifically shaped to receive a paper label.) While a polyethylene container could be very thin (e.g., thinner than about 0.01 inch) and still be considered a bottle for purposes of this invention, the application of pressure to such a container even at low temperatures would be such as to cause undesirable permanent increase in volume of more than about 3.5%. Maximum thickness is specified because at such thicknesses the resistance to deformation is so high that no significant benefit will be achieved by further increase.

The internal pressure which can be applied to the polyethylene bottle is dependent upon the bottle wall thickness, the time internal pressure is sustained and the material distribution of the bottle wall. The optimum pressure is slightly below that pressure that would cause the bottle to burst, given a pressure sustaining time. This pressure for a specified type bottle can essentially be determined by finding an average pressure that will burst the specified type bottle in a given pressure sustaining time from a sample of a number of such specified type bottles. A pressure of 5 p.s.i.g. less than this average bursting pressure is a safe one to use for that specified type bottle and with that given pressure sustaining time. Thinner bottles will have lower bursting pressures. Pressures referred to herein are differences in pressures between that on the inside wall and that on the outside wall of the bottle.

The usable pressure is also dependent on the material distribution of the bottle. If there are thin spots in the bottle wall, the internal pressure will act on these first. These thin spots may blow out before the pressure acts upon the thicker parts of the wall. Thus, the more even the bottle material distribution the more useful this invention is. With even material distribution in the bottle the directional orientation and reorientation of molecules and crystallites is more effective and the resistance to deformation of the entire bottle is improved.

It has generally been found that internal pressures from about 10 p.s.i.g. to about 50 p.s.i.g. and more preferably from about 20 p.s.i.g. to about 35 p.s.i.g. are usable within the scope of the present invention.

Theoretically the internal bottle pressure could be sustained for a long time. However, commercially quick strengthening is desirable. The pressurizing time is preferably adjusted to the factory line speed for bottle production. Thus, a time limit of not greater than about 5 minutes has been set, this being suitable for small scale operations. A pressure sustaining time for high speed operations has been found to be about 10 seconds. Preferably, therefore, the pressure should be sustained for about 10 seconds.

As previously stated, pressure and time are interdependent. If a short pressure sustaining time is chosen, a higher pressure can be applied than if a long pressure sustaining time is chosen. It is possible to start at a high pressure for a short period, then drop the pressure and sustain such a lower pressure. The internal pressure and time should be sufficient to orient crystallites and molecules of the walls of the polyethylene bottle in the direction of least strength, but should be insufficient to permanently increase the volume of the bottle more than 3.5%. If crystallites and molecules are already oriented for maximum strength before the application of pressure, application of pressure will provide no increase in resistance to deformation. If the bottle fractures or bursts from the application of internal pressure, its volume will be permanently increased more than 3.5%.

The 3.5% volume change limitation is critical because it is desirable for the bottle to recover to essentially its original configuration and so that outages will be kept uniform. The temperature of the recovery is not critical and is ordinarily room temperature. The pressurized bottle shrinks rapidly and resumes its original appearance within about one-half hour after the pressure treatment. The final volume to overflow of the pressurized container is reached within two to three days after pressurizing and is generally less than 3% greater than the volume of the bottle before it was pressurized. At pressurizing temperatures of 80° F. permanent increase in volume is generally less than 2%. There is no loss in bottle strength as the bottle shrinks.

A temperature in the range of about 60° to about 100° F. is important for the pressurizing step. In order to use temperatures lower than 60° F., it is necessary to cool the bottle. Such cooling is commercially undesirable. At temperatures somewhat above about 100° F. the bottle will usually permanently deform more than 3.5% when internal pressure is applied. Such permanent deformation is undesirable because it is necessary to preserve original bottle configuration and outage. The preferred temperature range is about 80° to about 100° F. and the optimum pressurizing temperature is 100° F.

It is believed that increased resistance to deformation resulting from a temporary internal over-pressure is due to partial crystallite or molecular orientation and reorientation in the direction of least container strength.

It is theorized that those crystallites in a polyethylene bottle which are reoriented by this process are those formed during bottle manufacture in a generally oriented manner in the bottle wall as it cools under air pressure in the mold and those which are oriented by this process are those formed in a generally random manner in the bottle wall after the bottle has been ejected from the mold and during the time it cools to room temperature. Molecular reorientation involves the rearrangement of the position of the molecules which were fixed in an ordered manner in the molding process. Permanent changes in the stress line pattern of pressurized, unpigmented, blow molded polyethylene bottles can be observed by means of polarized light. The stress pattern as seen under a polariscope is brighter, sharper and more distinct for a given bottle after pressurizing than before pressurizing; this is evidence of orientation and reorientation of crystallites.

It has further been found that the above-described process often increases the compression strength of the polyethylene bottles so treated.

It has further been found that the above-described process can often increase the resistance to stress cracking of polyethylene bottles so treated.

The phenomenon of stress cracking is well known in plastics and is described on page 397 and page 398 of "A Review of Stress Cracking in Polyethylene," SPE Journal, May 1959. In substance the article says there are stresses within plastic that in combination with some blemish in the surface of the plastic cause cracking. No one knows exactly why. It has been found that polyethylene bottles of 1600E Hercules resin and having a density of .945, a capacity of 12 oz., weighing 21.1±.3 grams, in the shape of Design Patent 187,754, and having wall thicknesses from about 0.012 to about 0.027 inch show increased stress crack resistance after being pressurized at 28 and 30 p.s.i.g. at 100° F. for 10 seconds.

The internal stress can be applied and crystallites and molecules oriented and reoriented in the direction of least strength in the following exemplary manner: Polyethylene bottles of the type described in the preceding paragraph at 100° F. are screwed onto a cap in which has been inserted a tube leading to a source of pressurized air or other inert gas. The pressurized air or other inert gas, such as nitrogen, is let into the bottle and the bottle balloons out, orienting and reorienting crystallites and molecules in the direction of least strength. The 100° F. temperature is maintained during the pressurizing. After a suitable period of time (about 10 seconds) the pressure is released and the bottle reverts essentially to its normal shape within one-half hour and attains a volume less than a 3.5% increase of its original volume within two to three days. The pressure used is about 5 p.s.i.g. below the predetermined bursting pressure. The bursting pressure is calculated by taking an average bursting pressure for a 10 second period over a sample of, say, 10 identical bottles.

An apparatus for performing the process of this invention in such an exemplary manner is depicted in FIGURE 1. A pressure source 1, such as a nitrogen tank, is attached by a tube 2 having a valve 3 to a reserve pressure tank 4 with a pre-set pressure gauge 5. Pipe 6 having solenoid valve 7 leads from the reserve tank 4 and is connected to the bottle 8 by an adapter 9 made to fit the bottle and having a standard air line fitting. Also in pipe 6 are relief valve 10 and pressure gauge 11. The pre-set gauge 5 should be set higher than the actual pressure on the bottle due to pressure drop when the solenoid valve 7 is opened. The actual pressure on the bottle is shown by pressure gauge 11. With the particular equipment used it was found that the pre-set gauge 5 should be set about 4 p.s.i.g. higher than the internal pressure wanted in the bottle 8.

The pre-set gauge 5 is set and the pressure source 1 is turned on. The bottle 8 is connected to the adapter 9. After the pre-set pressure is attained in reserve tank 4, pre-set gauge 5 shuts the valve 3 between the pressure source 1 and reserve tank 4. With the bottle in place and the relief valve 10 shut, the solenoid valve 7 is opened for 10 seconds and then closed. The relief valve 10 is opened at the end of the 10 seconds. With suitable automatic conveying equipment, suitable equipment and automatic controls, high speed bottle treatment can be achieved.

Figure 2:
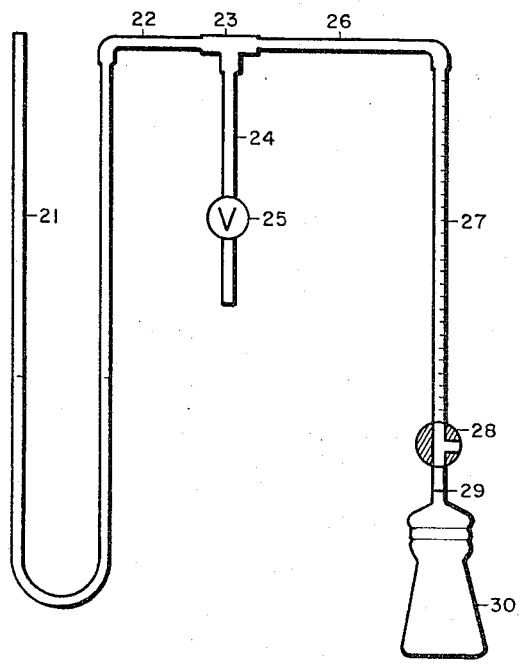
FIGURE 2 is an apparatus, diagrammatically shown, for testing resistance to deformation of polyethylene bottles.

An apparatus for comparing the resistance to deformation of bottles pressure treated by the process of the present invention with identically manufactured bottles which have not been so treated is depicted in FIGURE 2.

A water manometer 21 is connected by rubber tube 22 to T-shaped glass tube 23. Rubber tube 24 having valve 25 is connected to the vertical projection of tube 23. Rubber tube 26 connects tube 23 with cc.-calibrated buret 27 having three-way valve 28. An adapter 29 connects buret 27 to the pressure-treated bottle 30 to be tested.

The bottle 30 to be tested is filled with water using a separatory funnel. The empty tip 29 of filled stoppered buret 27 with three-way valve 28 closed is gently forced into bottle 30. A small amount of water flows into the buret tip 29 at this time. The zero reading on the buret which must be the same for all bottles to be tested, is then set by opening valve 28 to the air and draining the buret to the predetermined zero-reading setting. Valve 28 is set so as to be closed to the air and open to the bottle 30 and buret 27. Valve 25 is then opened and water is displaced from bottle 30 into buret 27 by drawing a vacuum on the opening of tube 24. When a given water displacement is reached within the cc. readings on buret 27, valve 25 is closed. After 5 seconds, a valve 28 is closed to bottle 30, buret 27 and air and a manometer reading taken on manometer 21. This procedure is repeated for other water displacements.

Manometer readings are taken over a wide range of water displacements, usually 2 to 40 cc., both for bottles pressure-treated by the process of the present invention and identically manufactured untreated bottles. Water displacement can then be plotted against manometer reading for each bottle tested and the curves compared. A greater amount of suction will have to be applied to a bottle having a greater resistance to deformation in order to displace a given amount of water. Thus, for a given displacement a bottle having a greater resistance to deformation will have a higher manometer reading than a weaker bottle for the same displacement.

The stress crack resistance of polyethylene bottles can be tested as follows: The bottles are brought to 70–80° F. and filled with a specified liquid product. The bottles are closed tightly. The bottles are then placed on trays or in containers (half upright and half inverted), stored at 140° F. and are examined periodically to see when cracking occurs. Bottles that feel "soft" or obviously have lost pressure are considered cracked.

The following specific examples are merely illustrative and are not to be construed in any way as limiting the scope of the invention.

EXAMPLE I

One hundred Owens-Illinois polyethylene bottles of 1600E Hercules resin having a density of .945, a capacity of 12 oz., weighing 21.1±.3 grams, blow-molded in the shape of Design Patent 187,754, and of label panel wall thickness ranging from about 0.012 inch to about 0.027 inch were subjected to temporary internal over-pressure with an apparatus as depicted in FIGURE 1. The bottles at 100° F. were subjected to the application of pressures ranging from 20 p.s.i.g. to 29 p.s.i.g. for 10 seconds. The bottles were tested for resistance to deformation by the method heretofore described and with the apparatus depicted in FIGURE 2, both before and three days after pressurizing.

Readings were taken only at displacements of 4, 8 and 12 cc. of water. In this case a displacement of 4 cc. was equal to the decrease in internal pressure caused by absorption of the oxygen ordinarily in the headspace by the liquid in the bottle.

Because of the nature of the resistance to deformation testing equipment, it was not always possible to get a manometer reading for the same displacement before and after pressurizing. The following table shows those bottles for which accurate comparisons could be made as to resistance to deformation for a given displacement.

*Table I*

| Bottle Number | P.s.i.g. Applied | Displacement [1] | P (Before Pressurizing) [2] | P (After Pressurizing) [2] | Percent ΔV [3] |
|---|---|---|---|---|---|
| 4 | 28 | 4.0 | 212 | 229 | .93 |
| 4 | 28 | 8.1 | 358 | 379 | .93 |
| 9 | 28 | 4.0 | 205 | 225 | .45 |
| 9 | 28 | 8.0 | 355 | 381 | .45 |
| 38 | 28 | 4.0 | 213 | 227 | .60 |
| 38 | 28 | 8.0 | 350 | 375 | .60 |
| 44 | 28 | 4.0 | 209 | 225 | .60 |
| 56 | 28 | 8.0 | 350 | 371 | 1.81 |
| 56 | 28 | 12.0 | 460 | 487 | 1.81 |
| 69 | 28 | 7.8 | 340 | 369 | 1.36 |
| 69 | 28 | 11.9 | 460 | 485 | 1.36 |
| 86 | 28 | 4.0 | 203 | 225 | .60 |
| 86 | 28 | 11.9 | 462 | 491 | .60 |
| 92 | 25 | 8.0 | 356 | 378 | 1.21 |
| 92 | 25 | 12.0 | 466 | 493 | 1.21 |
| 93 | 25 | 4.0 | 213 | 229 | .30 |
| 93 | 25 | 8.0 | 352 | 378 | .30 |
| 93 | 25 | 12.0 | 466 | 501 | .30 |

[1] Displacement is in cc. of water.
[2] P is resistance to deformation of the bottle expressed as the manometer reading in mm. water.
[3] Percent ΔV is the percent of change in volume 3 days after pressurizing.

It can be seen from Table I that the bottles after pressurizing had greater resistance to deformation than before pressurizing and that the percent of change in volume after 3 days was always less than 2%.

EXAMPLE II

A 12 oz., 23.8 gram Owens-Illinois polyethylene bottle of density .945 blow-molded in the shape of Design Patent 185,332 and with label panel wall thickness ranging from about 0.015 inch to about 0.030 inch was subjected to 30 p.s.i.g. pressure for 5 minutes at 100° F. with an apparatus as depicted in FIGURE 1. The bottle was tested for resistance to deformation over a wide range of water displacements by the method heretofore described and with the apparatus depicted in FIGURE 2, and was compared to a similar unpressurized bottle from the same mold. Table II which follows compares the resistance to deformation of the pressurized bottle and a similar non-pressurized bottle.

Table II

| Pressurized Bottle | | Non-Pressurized Bottle | |
|---|---|---|---|
| P [1] | Displacement [2] | P [1] | Displacement [2] |
| 177 | 2.0 | 151 | 2.0 |
| 379 | 5.1 | 330 | 5.2 |
| 523 | 8.2 | 419 | 8.0 |
| 575 | 10.2 | 495 | 10.1 |
| 635 | 12.1 | 549 | 92.1 |
| 695 | 14.1 | 602 | 94.4 |
| 741 | 16.3 | 624 | 16.2 |
| 767 | 18.5 | 638 | 18.1 |

[1] P=resistance to deformation of the bottle expressed as manometer reading in mm. water.
[2] Displacement is in cc. of water.

It can be seen from Table II that resistance to deformation is increased by pressurizing.

Percentage of permanent change in volume in the pressurized bottle was not measured but was less than 3.5%.

EXAMPLE III

Twenty 22 oz., 37.3±.3 grams Owens-Illinois polyethylene bottles of density .945 and blow-molded in the shape of Design Patent 185,332 and label panel wall thickness ranging from about 0.025 inch to about 0.040 inch were treated as follows:

(a) Five were subjected to a pressure of 25 p.s.i.g. for 1 minute at 100° F.
(b) Five were subjected to a pressure of 30 p.s.i.g. for 10 seconds at 100° F.
(c) Five were subjected to a pressure of 25 p.s.i.g. for 1 minute at 80° F.
(d) Five were subjected to a pressure of 30 p.s.i.g. for 10 seconds at 80° F.

The bottles were tested for resistance to deformation over a wide range of water displacements by the method heretofore described and with the apparatus depicted in FIGURE 2. The resistance to deformation of similar unpressurized bottles was similarly tested. FIGURE 3 is a graphical plotting of average values of resistance to deformation or manometer reading in mm. water vs. displacement in cc. water. Curve IA in FIGURE 3, represents a bottle pressurized under conditions (a) described above; curve IB under conditions (b) above; curve IIA under conditions (c) above; curve IIB under conditions (d) above. Curve IIC represents the unpressurized bottles.

As can be seen from a comparison of curves, resistance to deformation was improved by pressurizing, and the improvement was greater in pressurizing at 100° F. than in pressurizing at 80° F.

Percentage of permanent change in volume was not measured but was not more than 3.5%.

EXAMPLE IV

Plax polyethylene bottles having a capacity of 12 oz., a weight of 28.15±.05 grams, a density of .945, a label panel wall thickness ranging from about 0.027 inch to about 0.044 inch and blow-molded in the shape of Design Patent 185,332, were pressurized under the following conditions:

(a) One bottle at 30 p.s.i.g. for 5 minutes at 80° F.
(b) One bottle at 10 p.s.i.g. for 15 seconds, 20 p.s.i.g. for 15 seconds and 30 p.s.i.g. for 4.5 minutes all at 100° F.

The bottles were tested for resistance to deformation over a wide range of water displacements by the method heretofore described and the apparatus depicted in FIGURE 2. The resistance to deformation of similar unpressurized bottles was similarly tested FIGURE 4 is a graphical plotting of resistance to deformation or manometer reading in mm. water vs. displacement in cc. water. Curve A represents a bottle pressurized under conditions (a) described above; curve B, (b) above; curve C, unpressurized.

As can be seen from a comparison of curves, resistance to deformation was improved by pressurizing, and the improvement was greater in pressurizing at 100° F. than in pressurizing at 80° F.

The following table shows percentage volume increase determined after the time intervals shown.

TABLE III (a [1])

| Time: | Percent $\Delta V$ [3] |
|---|---|
| 4 hours | 2.49 |
| 3 days | 1.89 |

(b [2])

| Time: | Percent $\Delta V$ [3] |
|---|---|
| 20 hours | 3.08 |
| 4 days | 3.00 |
| 7 days | 2.93 |

[1] Bottle pressurized at conditions (a) above.
[2] Bottles pressurized at conditions (b) above.
[3] Percentage increase in volume.

As can be seen from the above table the permanent increase in volume was not greater than 3.5%.

EXAMPLE V

Owens-Illinois polyethylene bottles of 1600E Hercules resin and having a density of .945, a capacity of 12 oz., weighing 21.1±0.3 grams, blow-molded in the shape of Design Patent 187,754 and of label panel wall thickness ranging from about 0.012 inch to about 0.027 inch were subjected to temporary internal overpressure with an apparatus as depicted in FIGURE 1. The bottles at 100° F. were pressurized for 10 seconds at 28 p.s.i.g. and 30 p.s.i.g. The following table compares the stress cracking resistance figured by the procedure hereinbefore described of pressurized and unpressurized identically-manufactured bottles. The bottles were completely filled with a liquid detergent, capped and stored at 140° F. Lack of any outage in the bottles provided extreme conditions.

Table IV

[Number of Bottles Tested=80]

| Number of Days of Testing | 1 | 18 | 21 | 23 | 25 | 28 | 30 | 32 | 35 | 37 | 39 | 42 | 44 | 46 | 49 | 51 | 53 | 56 | 58 | 63 | 65 | 67 | 70 | 72 |
|---|---|---|---|---|---|---|---|---|---|---|---|---|---|---|---|---|---|---|---|---|---|---|---|---|
| Unpressurized [1] | | 1 | 10 | 27 | 54 | 73 | 75 | 79 | 80 | | | | | | | | | | | | | | | |
| Pressurized [1] | | | | | | | | 5 | 8 | 11 | 17 | 19 | 25 | 33 | 37 | 43 | 46 | 52 | 57 | 66 | 67 | 71 | 72 | 73 |
| Damaged in Handling (cumulatively) | 1 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 |

[1] The number having cracked on a particular day (cumulatively).

As can be seen from Table IV all 80 non-pressurized bottles had stress cracked by 35 days. On the other hand only 8 of the 79 (1 damaged in handling) pressurized bottles stress cracked by the 35th day. Moreover on the 72nd day, 4 of the pressurized bottles had still not stress cracked.

The permanent percentage volume increase was not greater than 3.5%.

What is claimed is:

1. A process for increasing resistance to deformation of bottles made from polyethylene of density from about .940 to about .950 and having wall thicknesses ranging from about 0.01 inch to about 0.06 inch comprising the steps of (1) expanding the volume of said bottles by application of internal pressure on the bottles in the range of about 10 p.s.i.g. to about 50 p.s.i.g., (2) sustaining internal pressure for a period of time no greater than about 5 minutes; the internal pressure and time being sufficient to orient and reorient crystallites and molecules of the wall of said bottles in the direction of least strength but insufficient to permanently increase the volume of said bottle more than about 3.5%, (3) effecting recovery of said bottle to substantially its original configuration, the temperature of said orientation and reorientation being within the range of about 60° to about 100° F.

2. The process of claim 1 wherein the density of the polyethylene is .945 and the internal pressure is not greater than the pressure which is 5 p.s.i.g. lower than the predetermined bursting pressure of said bottles.

3. The process of claim 2 wherein the bottle wall thicknesses range from about 0.012 inch to about 0.044 inch.

4. The process of claim 3 wherein the internal pressure applied to the bottle ranges from about 20 p.s.i.g. to about 35 p.s.i.g.

5. The process of claim 4 wherein the temperature of the orientation and reorientation ranges from about 80° F. to about 100° F.

6. The process of claim 5 wherein the internal pressure sustaining time is about 10 seconds.

7. The process of claim 6 wherein the temperature of the orientation and reorientation is about 100° F.

No references cited.

ROBERT F. WHITE, *Primary Examiner.*

A. R. NOE, *Assistant Examiner.*